(12) United States Patent
Li

(10) Patent No.: US 12,483,289 B2
(45) Date of Patent: Nov. 25, 2025

(54) TRANSCEIVER AND METHOD FOR SUPPRESSING HARMONIC SIGNAL IN TRANSCEIVER

(71) Applicant: Realtek Semiconductor Corp., HsinChu (TW)

(72) Inventor: Yu-Jung Li, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 43 days.

(21) Appl. No.: 18/434,715

(22) Filed: Feb. 6, 2024

(65) Prior Publication Data

US 2024/0283481 A1 Aug. 22, 2024

(30) Foreign Application Priority Data

Feb. 21, 2023 (TW) ................................. 112106291

(51) Int. Cl.
*H04B 1/40* (2015.01)

(52) U.S. Cl.
CPC ...................................... *H04B 1/40* (2013.01)

(58) Field of Classification Search
CPC ................................ H04B 1/40; H04B 1/0475
USPC .................................................. 375/219–220
See application file for complete search history.

(56) References Cited

U.S. PATENT DOCUMENTS

| | | | | |
|---|---|---|---|---|
| 5,889,436 | A * | 3/1999 | Yeung | H03L 7/0996 331/25 |
| 10,649,067 | B1 * | 5/2020 | Yang | G01S 7/038 |
| 2007/0060075 | A1 * | 3/2007 | Mikuteit | G06K 7/0008 343/726 |
| 2008/0056337 | A1 * | 3/2008 | Tal | H03B 21/02 331/37 |
| 2009/0015378 | A1 * | 1/2009 | Song | H04Q 9/00 340/10.1 |

(Continued)

FOREIGN PATENT DOCUMENTS

TW 202008737 A 2/2020

OTHER PUBLICATIONS

Behzad Razavi, "The Harmonic-Rejection Mixer", IEEE Solid-State Circuits Magazine, p. 10-p. 14, IEEE, USA., 2018.

*Primary Examiner* — Emmanuel Bayard
(74) *Attorney, Agent, or Firm* — Winston Hsu

(57) ABSTRACT

A transceiver and a method for suppressing a harmonic signal in a transceiver are provided. The transceiver includes a transmitter, a compensation circuit, a power combiner, a receiver and a digital baseband circuit. The transmitter outputs a transmitted signal, wherein the transmitted signal includes a main signal having a frequency equal to $f_{rf}$ and the harmonic signal having a frequency equal to $(N \times f_f)$, and N is a non-integer less than one. The compensation circuit outputs a compensation signal having a frequency equal to $(N \times f_{rf})$. The power combiner combines the transmitted signal and the compensation signal to generate a combined signal. The receiver receives the combined signal and suppresses the main signal within the combined signal to generate a feedback signal. The digital baseband circuit controls a magnitude of the compensation signal according to a magnitude of the feedback signal.

20 Claims, 5 Drawing Sheets

(56) References Cited

U.S. PATENT DOCUMENTS

| | | | | |
|---|---|---|---|---|
| 2009/0130981 A1* | 5/2009 | Nagai | ............... | G06K 19/0723 |
| | | | | 455/67.11 |
| 2009/0186582 A1* | 7/2009 | Muhammad | ........... | H04B 1/525 |
| | | | | 455/63.1 |
| 2011/0051833 A1* | 3/2011 | Midya | .................... | H04B 1/525 |
| | | | | 375/267 |
| 2018/0006795 A1* | 1/2018 | Raaf | ...................... | H04B 1/525 |
| 2020/0313716 A1* | 10/2020 | Bhat | ...................... | H04B 1/123 |
| 2024/0330614 A1* | 10/2024 | Mueller | ............. | G06K 7/10019 |

* cited by examiner

TRANSCEIVER AND METHOD FOR SUPPRESSING HARMONIC SIGNAL IN TRANSCEIVER

BACKGROUND OF THE INVENTION

1. Field of the Invention

The present invention is related to harmonics suppression, and more particularly, to a transceiver and a method for suppressing a harmonic signal in a transceiver.

2. Description of the Prior Art

A local oscillation source of a transmitter is typically implemented with a voltage control oscillator (VCO) operating at twice a radio frequency (RF). After processing by a divided-by-two divider, a local oscillation signal with the radio frequency is thereby generated. Under this architecture, the VCO may suffer from pulling of a second order harmonic of an RF signal output by the transmitter. In order to avoid frequency pulling of an integer multiple of the radio frequency, the VCO may be set to operate at a non-integral multiple of the radio frequency, wherein a divider may generate the local oscillation signal via a non-integral divisor. Even though this method solves the frequency pulling problem, fractional RF harmonics are generated by adopting the divider with the non-integral divisor, thereby affecting some specifications such as Federal Communications Commission (FCC) security certifications.

How to suppress harmonics has therefore become an important issue in this field. Related arts typically aim at suppression methods for integral RF harmonics, and are unable to effectively solve the problem of the fractional RF harmonics. Thus, there is a need for a novel architecture and an associated method which can suppress the fractional RF harmonics under a condition where the VCO operates at the non-integral multiple of the radio frequency.

SUMMARY OF THE INVENTION

An objective of the present invention is to provide a transceiver and a method for suppressing a harmonic signal in a transceiver, which can solve the problem of the related art without introducing any side effect or in a way that is less likely to introduce side effects.

At least one embodiment of the present invention provides a transceiver. The transceiver comprises a transmitter, a compensation circuit, a power combiner, a receiver and a digital baseband circuit. The transmitter is configured to output a transmitted signal, wherein the transmitted signal comprises a main signal and a harmonic signal, a frequency of the main signal is $f_{rf}$, a frequency of the harmonic signal is $(N \times f_{rf})$, and N is a non-integer less than one. The compensation circuit is configured to output a compensation signal, wherein a frequency of the compensation signal is $(N \times f_{rf})$. The power combiner is coupled to the transmitter and the compensation circuit, and is configured to combine the transmitted signal and the compensation signal to generate a combined signal. The receiver is coupled to the power combiner, and is configured to receive the combined signal and suppress the main signal within the combined signal to generate a feedback signal. The digital baseband circuit is coupled to the compensation circuit and the receiver, and is configured to control a magnitude of the compensation signal transmitted by the compensation circuit according to a magnitude of the feedback signal.

At least one embodiment of the present invention provides a method for suppressing a harmonic signal in a transceiver. The method comprises: utilizing a transmitter of the transceiver to output a transmitted signal, wherein the transmitted signal comprises a main signal and the harmonic signal, a frequency of the main signal is $f_{rf}$, a frequency of the harmonic signal is $(N \times f_{rf})$, and N is a non-integer less than one; utilizing a compensation circuit of the transceiver to output a compensation signal, wherein a frequency of the compensation signal is $(N \times f_{rf})$; utilizing a power combiner of the transceiver to combine the transmitted signal and the compensation signal to generate a combined signal; utilizing a receiver of the transceiver to receive the combined signal and suppress the main signal within the combined signal to generate a feedback signal; and utilizing a digital baseband circuit of the transceiver to control a magnitude of the compensation signal transmitted by the compensation circuit according to a magnitude of the feedback signal.

The transceiver and the method provided by the embodiments of the present invention return information related to the harmonic signal to the digital baseband circuit through the receiver therein, and accordingly control the compensation circuit to generate the compensation signal with the corresponding magnitude, in order to make the compensation signal and the harmonic signal within the transmitted signal cancel each other.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
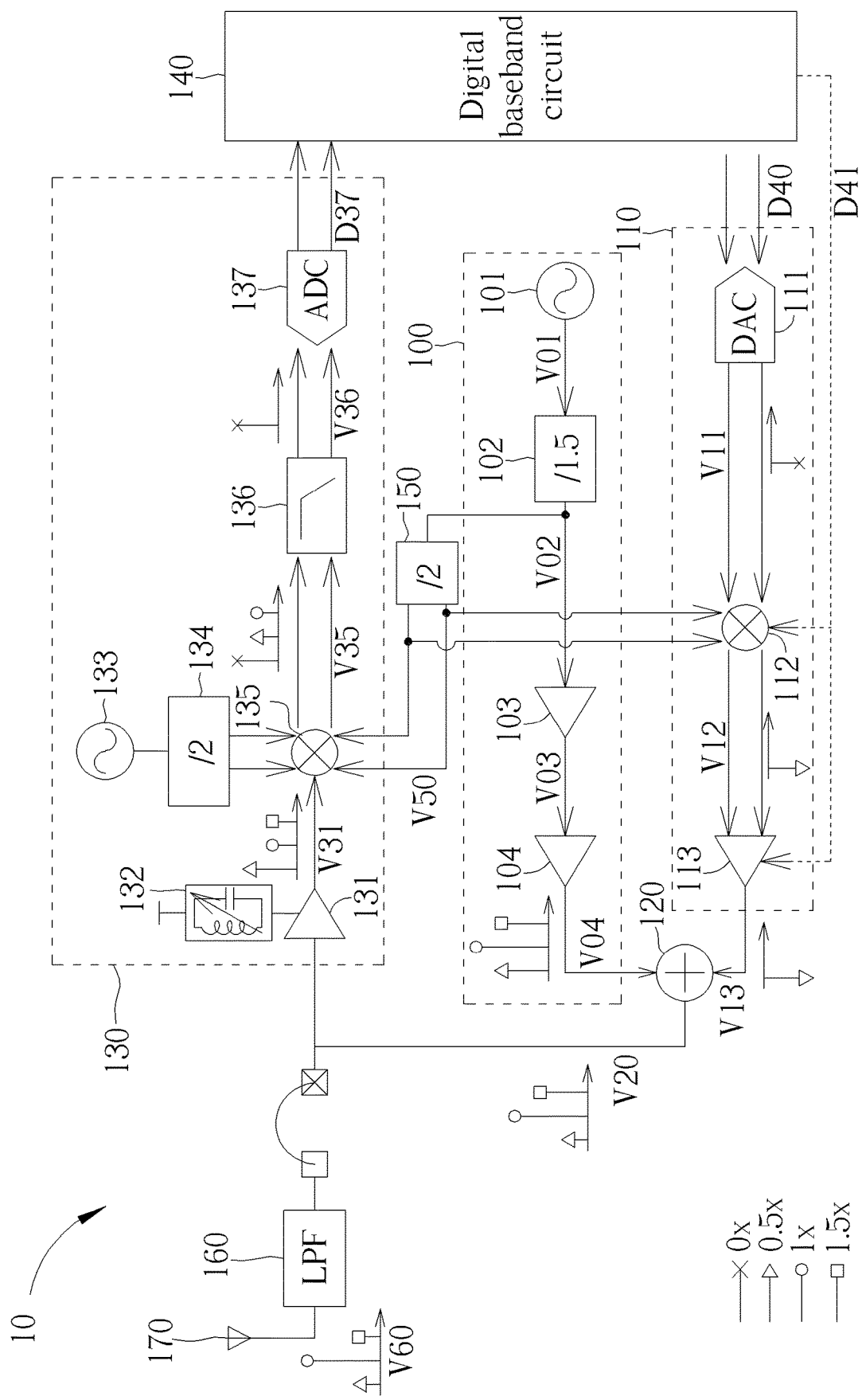
FIG. 1 is a diagram illustrating a transceiver according to a first embodiment of the present invention.

FIG. 1 is a diagram illustrating a transceiver 10 according to a first embodiment of the present invention. As shown in FIG. 1, the transceiver 10 may comprise a transmitter 100, a compensation circuit 110, a power combiner 120, a receiver 130, a digital baseband circuit 140, a discrete low pass filter 160 and an antenna 170. In this embodiment, the transmitter 100 is configured to output a transmitted signal V04. The transmitted signal V04 may comprise a main signal and at least one harmonic signal. A frequency of the main signal is $f_{rf}$, and the at least one harmonic signal comprises a harmonic signal having a frequency equal to $(N1 \times f_{rf})$ and a harmonic signal having a frequency equal to $(N2 \times f_{rf})$, where N1 is a non-integer less than one, and N2 is a non-integer greater than one. In this embodiment, N1 is equal to 0.5 and N2 is equal to 1.5. For brevity, signals with frequencies equal to $f_{rf}$ are labeled "1×" in figures, signals with frequencies equal to $(0.5 \times f_{rf})$ are labeled "0.5×" in figures, signals with frequencies equal to $(1.5 \times f_{rf})$ are labeled "1.5×" in figures, and signals with frequencies equal to zero (e.g., signals carried by carrier waves having a frequency equal to zero, which may be referred to as zero-frequency signals) are labeled "0×" in figures. The compensation circuit 110 is configured to output a compensation signal V13, where a frequency of the compensation signal V13 is (N1×$f_{rf}$) such as (0.5×$f_{rf}$). The power combiner 120 is coupled to the transmitter 100 and the compensation circuit 110, and is configured to combine the transmitted signal V04 and the compensation signal V13 to generate a combined signal V20. The receiver 130 is coupled to the power combiner 120, and is configured to receive the combined signal V20 and suppress the main signal (e.g., the signal with the frequency equal to (1×$f_{rf}$)) within the combined signal V20 to generate a feedback signal D37. The digital baseband circuit 140 is coupled to the compensation circuit 110 and the receiver 130, and is configured to control a magnitude of the compensation signal V13 transmitted by the compensation circuit 110 according to a magnitude of the feedback signal D37.

As shown in FIG. 1, the transmitter 100 may comprise an oscillator such as a voltage controlled oscillator (VCO) 101 providing a frequency of 1.5 times a radio frequency (RF), and is referred to as a 1.5×$f_{rf}$ VCO 101 for brevity. The transmitter 100 may further comprise a divided-by-M divider (where M is a non-integer greater than one) such as a divided-by-1.5 divider 102 (labeled "/1.5" in figures for brevity), and at least one power amplifier (PA), where the at least one PA may comprise a pre-amplifier 103 (e.g., a pre-driver of a PA) and a PA 104. The 1.5×$f_{rf}$ VCO 101 is configured to generate an oscillation signal V01, where a frequency of the oscillation signal VOI is (M×$f_{rf}$) such as (1.5×$f_{rf}$). The divided-by-1.5 divider 102 is coupled to the 1.5×$f_{rf}$ VCO 101, and is configured to perform frequency division upon the oscillation signal V01 to generate an oscillation signal V02 having a frequency equal to $f_{rf}$. The pre-amplifier 103 is coupled to the divided-by-1.5 divider 102, and is configured to pre-amplify a power of the oscillation signal V02 to generate a pre-driving signal V03. The PA 104 is coupled to the pre-amplifier 103, and is configured to amplify a power of the pre-driving signal V03 to generate the transmitted signal V04. In some embodiments, the at least one PA may be implemented by a PA in one stage only. For example, implementation of the pre-amplifier 103 may be omitted, and the PA 104 may be coupled to the divided-by-1.5 divider 102, to utilize the PA 104 only for amplifying the power of the oscillation signal V02 to generate the transmitted signal V04.

In this embodiment, the transceiver 10 may further comprise a divided-by-K divider (e.g., K is a positive integer) such as a divided-by-2 divider 150 (labeled "/2" in figures for brevity), where the divided-by-2 divider 150 is coupled to the divided-by-1.5 divider 102. The divided-by-2 divider 150 is configured to perform frequency division upon the oscillation signal V02 to generate an oscillation signal V50 having a frequency equal to (0.5×$f_{rf}$), where the compensation circuit 110 may generate the compensation signal V13 according to the oscillation signal V50, and the receiver 130 may generate the feedback signal D37 according to the oscillation signal V50.

As shown in FIG. 1, the receiver 130 may comprise a low-noise amplifier (LNA) 131, an adjustable resonant tank such as a switchable frequency resonant tank 132, an oscillator such as a VCO 133 providing a frequency of two times the radio frequency (referred to as a 2×$f_{rf}$ VCO 133 for brevity), a divider such as a divided-by-2 divider 134 (labeled "/2" in figures for brevity), a down-converter such as a down-converting mixer 135, a low pass filter such as an intermediate frequency (IF) low pass filter 136, and an analog-to-digital converter (ADC) 137. The LNA 131 is coupled to the switchable frequency resonant tank 132, and is configured to suppress the main signal within the combined signal V20 (e.g., a signal having the frequency equal to $f_{rf}$ in the combined signal V20) to generate a filtered signal V31. The down-converting mixer 135 is coupled to the LNA 131, and is configured to perform down-conversion upon the filtered signal V31 according to the oscillation signal V50 (e.g., according to the frequency (0.5×$f_{rf}$) of the oscillation signal V50) to generate a down-converted signal V35 (more particularly, making signals having the frequencies (0.5×$f_{rf}$), $f_{rf}$ and (1.5×$f_{rf}$) in the filtered signal V31 be respectively down-converted into signals having the frequencies 0, (0.5× $f_{rf}$) and $f_{rf}$ in the down-converted signal V35). The IF low pass filter 136 is coupled to the down-converting mixer 135, and is configured to perform filtering upon the down-converted signal V35 (e.g., filtering out the signals having the frequencies (0.5×$f_{rf}$) and $f_{rf}$ in the down-converted signal V35) to generate a filtered signal V36. The ADC 137 is coupled to the IF low pass filter 136, and is configured to perform analog-to-digital conversion upon the filtered signal V36 to generate the feedback signal D37.

It should be noted that, when the receiver 10 operates in a transmitting mode, a resonant frequency of the switchable frequency resonant tank 132 may be switched to (0.5×$f_{rf}$), to make signals other than those having the frequency equal to (0.5×$f_{rf}$) in the filtered signal V31 be suppressed (e.g., making the signal having the frequency equal to (0.5×$f_{rf}$) in the filtered signal V31 having a maximum power gain). When the receiver 10 operates in a receiving mode, a signal received by the LNA 131 is a signal received by the antenna 170 from outside, and the resonant frequency of the switchable frequency resonant tank 132 may be switched to $f_{rf}$, to make signals other than those having the frequency equal to fir in the filtered signal V31 be suppressed (e.g., making the signal having the frequency equal to $f_{rf}$ in the filtered signal V31 having a maximum power gain), but the present invention is not limited thereto. In addition, when the receiver operates in the transmitting mode, the down-converting mixer 135 performs down-conversion upon the filtered signal V31 from the LNA 131 according to the frequency (0.5×$f_{rf}$) of the oscillation signal V50, where the 2×$f_{rf}$ VCO 133 and the divided-by-2 divider 134 may be disabled, or a local oscillation signal from the 2×$f_{rf}$ VCO 133 and the divided-by-2 divider 134 may be discarded. When the transceiver 10 operates in the receiving mode, the down-converting mixer 135 performs down-conversion upon the filtered signal V31 from the LNA 131 according to a frequency (i.e., $f_{rf}$) of the local oscillation signal from the 2×$f_{rf}$ VCO 133 and the divided-by-2 divider 134, where the divided-by-2 divider 150 may be disabled, or the oscillation signal V50 from the divided-by-2 divider 150 may be discarded.

As shown in FIG. 1, the compensation circuit 110 may comprise a digital-to-analog converter (DAC) 111, an up-converter such as an up-converting mixer 112, and a gain amplifier 113. More particularly, the DAC 111 is configured to generate an analog signal V11 according to a digital signal D40 output from the digital baseband circuit 140. The up-converting mixer 112 is coupled to the DAC 111, and is configured to perform up-conversion upon the analog signal V11 according to the oscillation signal V50 (e.g., according to the frequency (0.5×$f_{rf}$) of the oscillation signal V50) to generate an up-converted signal V12 (e.g., up-converting the zero-frequency signal within the analog signal V11 into a signal having a frequency equal to (0.5×$f_{rf}$) in the up-converted signal V12). The gain amplifier 113 is coupled to the up-converting mixer 112, and is configured to amplify the up-converted signal V12 to generate the compensation signal V13.

In some embodiments, the gain amplifier 113 may amplify the up-converted signal V12 according to a primary gain to generate the compensation signal V13, and the digital baseband circuit 140 may generate a control signal D41 according to a magnitude of the feedback signal D37 to control the primary gain provided by the gain amplifier 113. In some embodiments, the up-converting mixer 112 may generate the analog signal V12 further according to a secondary gain (e.g., the up-converting mixer 112 may further provide a portion of a signal gain in addition to performing up-conversion upon the analog signal V11), and the digital baseband circuit 140 may generate the control signal D41 according to the magnitude of the feedback signal D37 to control the primary gain provided by the gain amplifier 113 and the secondary gain provided by the up-converting mixer 112. It should be noted that the primary gain provided by the gain amplifier 113 and the secondary gain provided by the up-converting mixer 112 do not have to be controlled by a same signal. In some embodiments, the digital baseband circuit 140 may generate two signals according to the magnitude of the feedback signal D37, in order to respectively control the primary gain provided by the gain amplifier 113 and the secondary gain provided by the up-converting mixer 112, but the present invention is not limited thereto.

For example, during a detection phase of the transceiver 10, the transceiver 10 may set the magnitude of the compensation signal V13 to zero (e.g., the digital baseband circuit 140 may initialize the magnitude of the compensation signal V13 as zero by controlling the control signal D41 or the digital signal D40), and the digital baseband circuit 140 may determine a magnitude of the harmonic signal (e.g., the magnitude of the signal having the frequency equal to $(0.5 \times f_{rf})$ in the transmitted signal V04) according to the feedback signal D37 to generate a first detection result. During a compensation phase of the transceiver 10, the digital baseband circuit 140 may control the magnitude of the compensation signal V13 according to the first detection result, to make the compensation signal V13 and the harmonic signal within the transmitted signal V04 cancel each other (e.g., controlling the primary gain provided by the gain amplifier 113 and/or the secondary gain provided by the up-converting mixer 112 to make the magnitude of the compensation signal V13 be equal to or approach the magnitude of the signal having the frequency equal to $(0.5 \times f_{rf})$ in the transmitted signal V04).

In another example, during a detection phase of the transceiver 10, the combined signal V20 comprises a residual signal (e.g., the signal having the frequency equal to $(0.5 \times f_{rf})$ in the combined signal V20) generated by combing the harmonic signal within the transmitted signal V04 (e.g., the signal having the frequency $(0.5 \times f_{rf})$ in the transmitted signal V04) and the compensation signal V13, and the digital baseband circuit 140 may determine a magnitude of the residual signal according to the feedback signal D37 to generate a second detection result. During a compensation phase of the transceiver 10, the digital baseband circuit 140 may control the magnitude of the compensation signal V13 according to the second detection result, to make the magnitude of the residual signal approach zero (e.g., controlling the primary gain provided by the gain amplifier 113 and/or the secondary gain provided by the up-converting mixer 112, until the feedback signal D37 indicates that the magnitude of the signal having the frequency $(0.5 \times f_{rf})$ in the combined signal V20 is zero or approaches zero.

It should be noted that the operation of canceling the harmonic signal within the transmitted signal V04 performed by control of the compensation circuit 110 mentioned above is aimed at the signal having the frequency equal to $(0.5 \times f_{rf})$ in the transmitted signal V04. In this embodiment, the combined signal V20 may be transmitted to the discrete low pass filter 160 (labeled "LPF" in FIG. 1 for brevity), in order to filter out or suppress the signal having the frequency equal to $(1.5 \times f_{rf})$ in the combined signal V20, as illustrated by a signal V60.

In this embodiment, a phase of the analog signal V11 (which is generated by the DAC 111 according to the digital signal D40) and a phase of the transmitted signal V04 (more particularly, the signal having the frequency equal to $(0.5 \times f_{rf})$ in the transmitted signal V04) may have a 180-degree phase difference. Thus, under a condition where neither the up-converting mixer 112 nor the gain amplifier 113 reverse phases of signals, a phase of the compensation signal V13 output from the compensation circuit 110 and the phase of the transmitted signal (more particularly, the signal having the frequency equal to $(0.5 \times f_{rf})$ in the transmitted signal V04) may also have a 180-degree phase difference, making the signals having the frequency equal to $(0.5 \times f_{rf})$ in the transmitted signal V04 and the compensation signal V13 cancel each other when the power combiner 120 combines the transmitted signal V04 and the compensation signal V13, but the present invention is not limited thereto.

Figure 2:
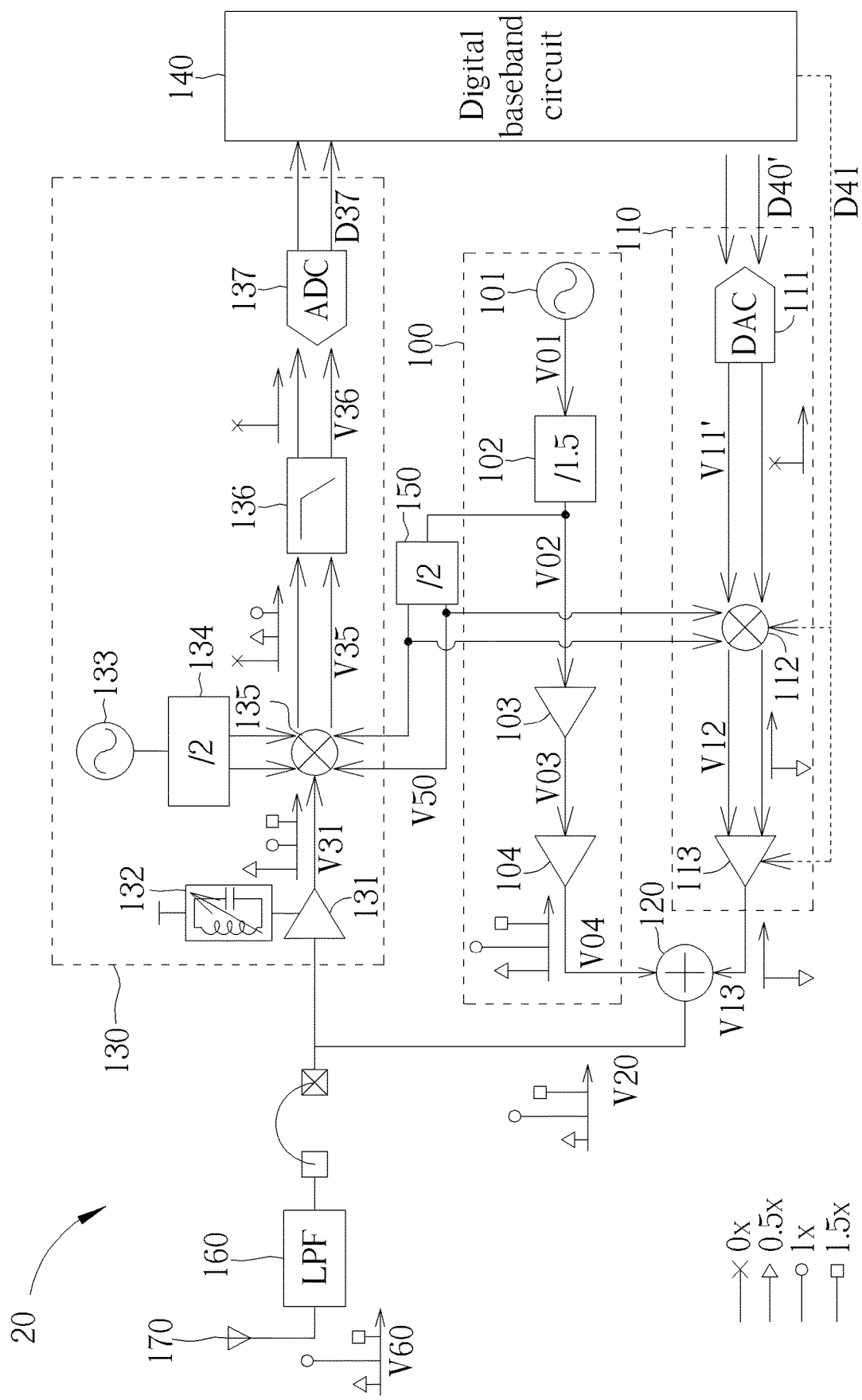
FIG. 2 is a diagram illustrating a transceiver according to a second embodiment of the present invention.

FIG. 2 is a diagram illustrating a transceiver 20 according to a second embodiment of the present invention. In comparison with the transceiver 10, the digital baseband circuit 140 within the transceiver 20 may transmit a digital signal D40', to make an analog signal V11' (which is generated by the DAC 111 according to the digital signal D40') and the transmitted signal V04 (more particularly, the signal having the frequency equal to $(0.5 \times f_{rf})$ in the transmitted signal V04) be in-phase (e.g., having a 0-degree phase difference). By changing connection between output terminals of the DAC 111 and input terminals of the up-converting mixer 112, the up-converting mixer 112 may provide a 180-degree phase difference to make a phase of the up-converted signal V12 generated according to the analog signal V11' and the phase of the transmitted signal V04 (more particularly, the signal having the frequency equal to $(0.5 \times f_{rf})$ in the transmitted signal V04) have a 180-degree phase difference. Remaining details are the same as the embodiment of FIG. 1, and will not be repeated here for brevity.

Figure 3:
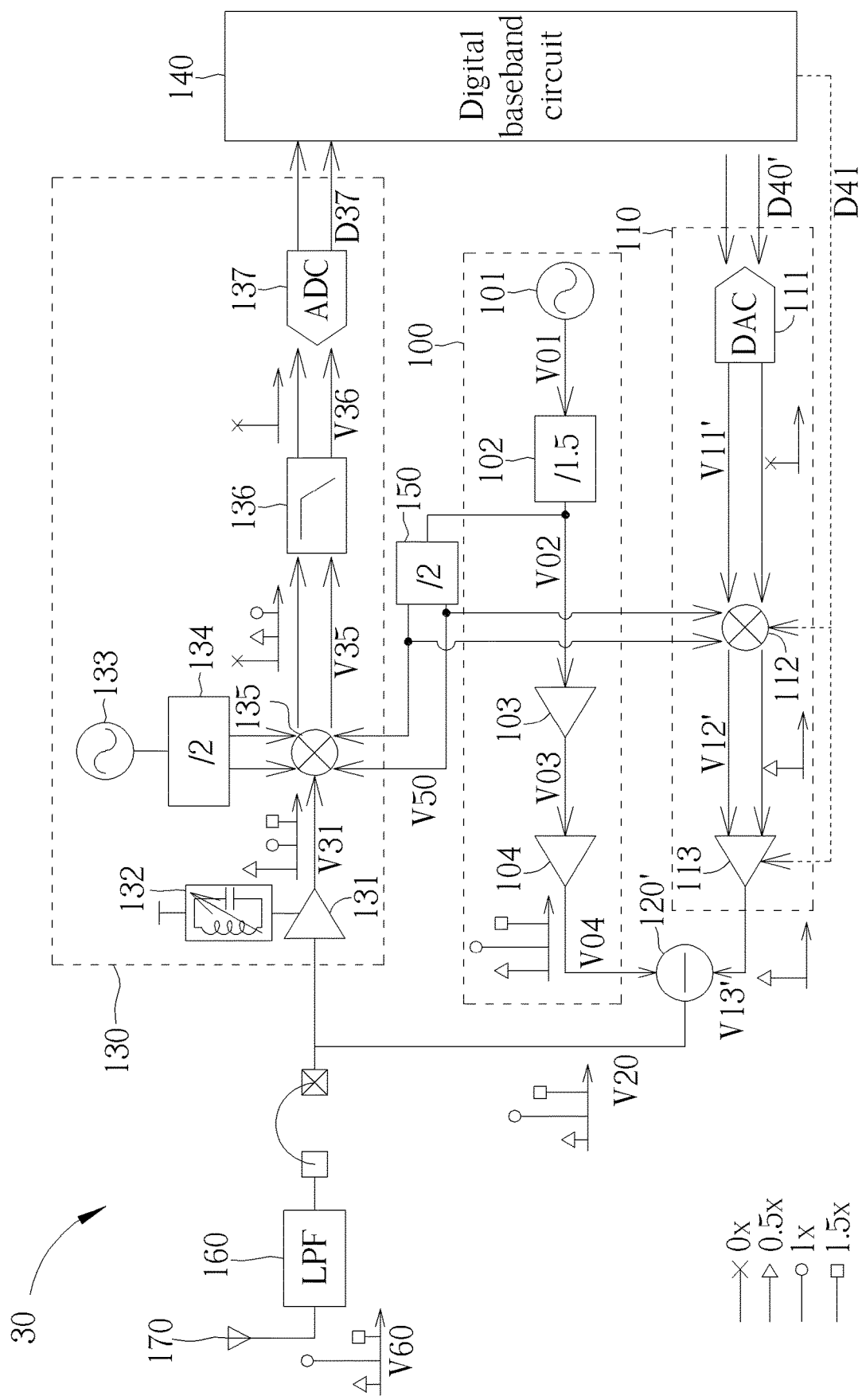
FIG. 3 is a diagram illustrating a transceiver according to a third embodiment of the present invention.

FIG. 3 is a diagram illustrating a transceiver 30 according to a third embodiment of the present invention. In comparison with the transceiver 10, the digital baseband circuit 140 within the transceiver 30 may transmit the digital signal D40', to make the analog signal V11' (which is generated by the DAC 111 according to the digital signal D40') and the transmitted signal V04 (more particularly, the signal having the frequency equal to $(0.5 \times f_{rf})$ in the transmitted signal V04) be in-phase (e.g., having a 0-degree phase difference). Thus, under a condition where neither the up-converting mixer 112 nor the gain amplifier 113 reverse phases of signals, each of an up-converted signal V12' output from the up-converting mixer 112 and a compensation signal V13' output from the gain amplifier 113 is in-phase (e.g., having a 0-degree phase difference) with the transmitted signal V04 (more particularly, the signal having the frequency equal to $(0.5 \times f_{rf})$ in the transmitted signal V04). It should be noted that the power combiner 120 of the previous embodiments may be implemented by a coupling transformer. Thus, a power combiner 120' having a function of signal subtraction may be implemented by changing connection of input terminals of the coupling transformer, in order to make the coupling transformer perform reverse coupling upon the transmitted signal V04 and the compensation signal V13', thereby achieving the purpose of making the signal having the frequency equal to $(0.5 \times f_{rf})$ in the transmitted signal V04 and the compensation signal V13' cancel each other. Remaining details are the same as the embodiment of FIG. 1, and will not be repeated here for brevity.

Figure 4:
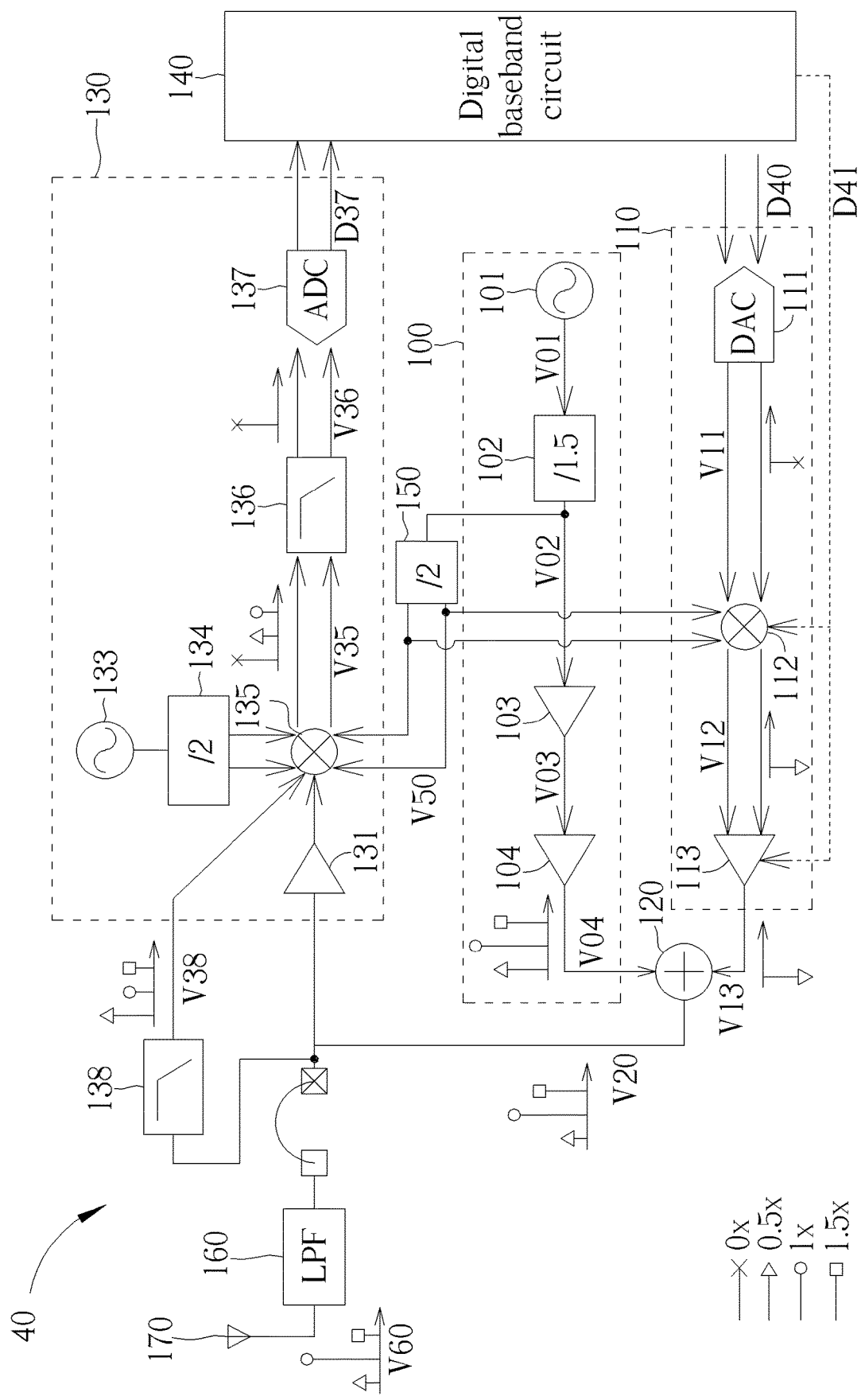
FIG. 4 is a diagram illustrating a transceiver according to a fourth embodiment of the present invention.

FIG. 4 is a diagram illustrating a transceiver 40 according to a fourth embodiment of the present invention. In comparison with the transceiver 10, the transceiver 40 may further comprise a low pass filter 138, and the switchable frequency resonant tank 132 may be omitted in this embodiment. The low pass filter 138 is coupled to the power combiner 120 and the down-converting mixer 135, and is configured to suppress the main signal within the combined signal V20 (e.g., suppressing the signal having the frequency equal to $f_{rf}$ in the combined signal V20) to generate a filtered signal V38, where the down-converting mixer 135 may perform down conversion upon the filtered signal V38 according to the oscillation signal V50 to generate the down-converted signal V35. When the transceiver 40 operates in the transmitting mode, the function of the low pass filter 138 may replace the function of the LNA 131, and thus the LNA 131 may be disabled at this moment, but the present invention is not limited thereto. Remaining details are the same as the embodiment of FIG. 1, and will not be repeated here for brevity.

Figure 5:
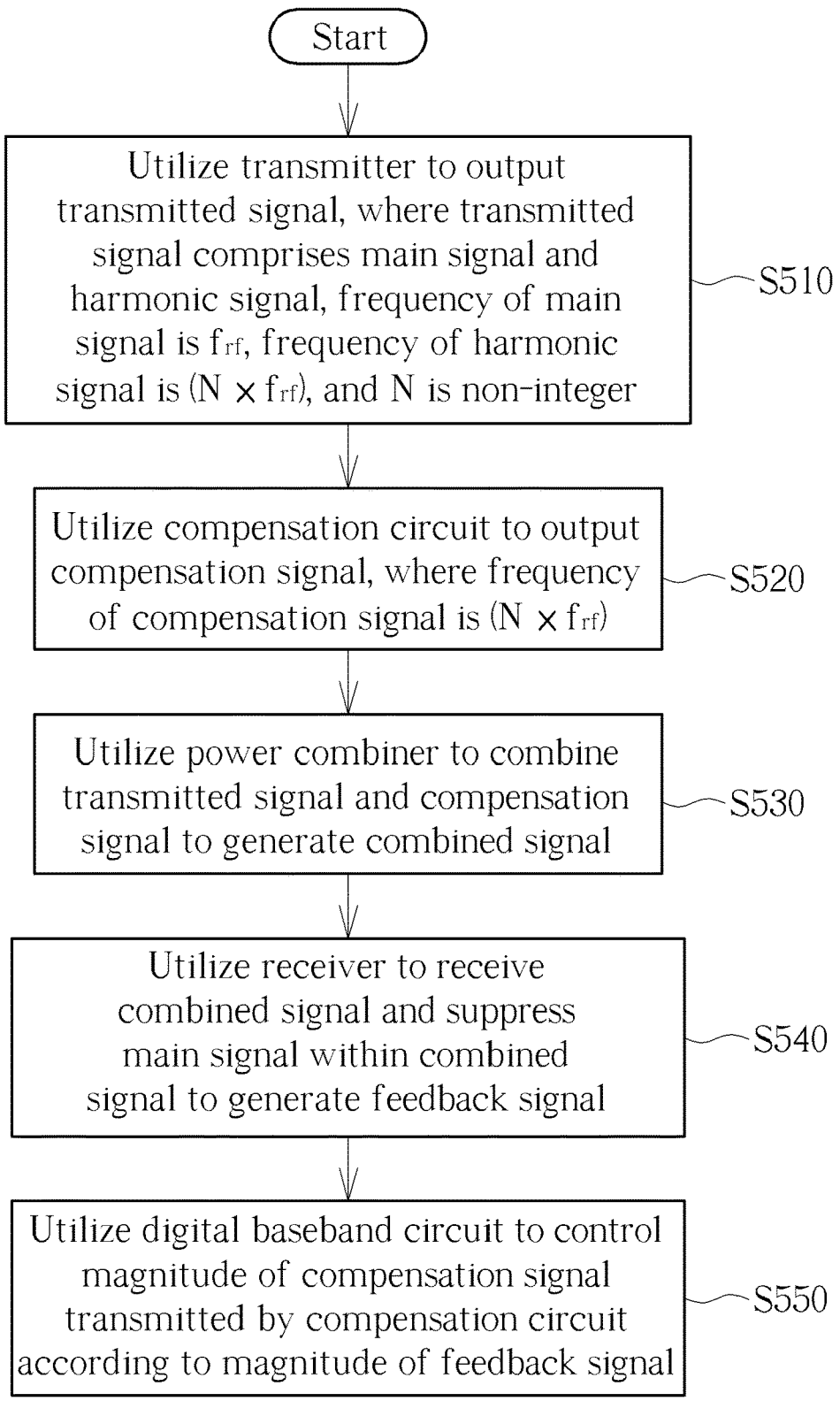
FIG. 5 is a diagram illustrating a working flow of a method for suppressing a harmonic signal in a transceiver according to an embodiment of the present invention.

FIG. 5 is a diagram illustrating a working flow of a method for suppressing a harmonic signal (e.g., the signal having the frequency equal to $(0.5 \times f_{rf})$) in a transceiver (e.g., the transceiver 10, 20, 30 or 40) according to an embodiment of the present invention. It should be noted that the working flow shown in FIG. 5 is for illustrative purposes only, and is not meant to be a limitation of the present invention. More particularly, one or more steps may be added, deleted or modified in the working flow shown in FIG. 5. In addition, if a same result can be obtained, these steps do not have to be executed in the exact order shown in FIG. 5.

In Step S510, the transceiver may utilize a transmitter therein to output a transmitted signal, where the transmitted signal comprises a main signal and the harmonic signal, a frequency of the main signal is $f_{rf}$, a frequency of the harmonic signal is $(N \times f_{rf})$, and N is a non-integer.

In Step S520, the transceiver may utilize a compensation circuit therein to output a compensation signal, where a frequency of the compensation signal is $(N \times f_{rf})$.

In Step S530, the transceiver may utilize a power combiner therein to combine the transmitted signal and the compensation signal to generate a combined signal.

In Step S540, the transceiver may utilize a receiver therein to receive the combined signal and suppress the main signal within the combined signal to generate a feedback signal.

In Step S550, the transceiver may utilize a digital baseband circuit therein to control a magnitude of the compensation signal transmitted by the compensation circuit according to a magnitude of the feedback signal.

To summarize, the present invention utilizes the receiver within the transceiver to transmit information of the harmonic signal having a frequency equal to a non-integral multiple of the radio frequency to the digital baseband circuit, to allow the digital baseband circuit to accordingly control the compensation circuit in order to provide a proper signal gain to the compensation signal, eventually making the harmonic signal with the non-integral multiple of the radio frequency in the signal output from the antenna be canceled as much as possible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A transceiver, comprising:
   a transmitter, configured to output a transmitted signal, wherein the transmitted signal comprises a main signal and a harmonic signal, a frequency of the main signal is $f_{rf}$, a frequency of the harmonic signal is $(N \times f_{rf})$, and N is a non-integer less than one;
   a compensation circuit, configured to output a compensation signal, wherein a frequency of the compensation signal is $(N \times f_{rf})$;
   a power combiner, coupled to the transmitter and the compensation circuit, configured to combine the transmitted signal and the compensation signal to generate a combined signal;
   a receiver, coupled to the power combiner, configured to receive the combined signal and suppress the main signal within the combined signal to generate a feedback signal; and
   a digital baseband circuit, coupled to the compensation circuit and the receiver, configured to control a magnitude of the compensation signal transmitted by the compensation circuit according to a magnitude of the feedback signal.

2. The transceiver of claim 1, wherein the transmitter comprises:
   an oscillator, configured to generate a first oscillation signal, wherein a frequency of the first oscillation signal is $(M \times f_{rf})$, and M is a non-integer greater than one;
   a divided-by-M divider, coupled to the oscillator, configured to perform frequency division upon the first oscillation signal to generate a second oscillation signal; and
   at least one power amplifier (PA), coupled to the divided-by-M divider, configured to amplify a power of the second oscillation signal to generate the transmitted signal.

3. The transceiver of claim 2, further comprising:
   a divided-by-K divider, coupled to the divided-by-M divider, configured to perform frequency division upon the second oscillation signal to generate a third oscillation signal, wherein K is a positive integer;
   wherein the compensation circuit generates the compensation signal according to the third oscillation signal, and the receiver generates the feedback signal according to the third oscillation signal.

4. The transceiver of claim 3, wherein a frequency of the third oscillation signal is $(N \times f_{rf})$.

5. The transceiver of claim 4, wherein N is equal to 0.5, M is equal to 1.5, and K is equal to 2.

6. The transceiver of claim 3, wherein the compensation circuit comprises:
   a digital-to-analog converter (DAC), configured to generate an analog signal according to a digital signal output from the digital baseband circuit;
   an up-converter, coupled to the DAC, configured to perform up-conversion upon the analog signal according to the third oscillation signal to generate an up-converted signal; and a gain amplifier, coupled to the up-converter, configured to amplify the up-converted signal to generate the compensation signal.

7. The transceiver of claim 6, wherein the gain amplifier amplifies the up-converted signal according to a primary gain to generate the compensation signal, and the digital baseband circuit controls the primary gain of the gain amplifier according to the magnitude of the feedback signal.

8. The transceiver of claim 7, wherein the up-converter generates the analog signal further according to a secondary gain, and the digital baseband circuit controls the primary gain of the gain amplifier and the secondary gain of the up-converter according to the magnitude of the feedback signal.

9. The transceiver of claim 3, wherein the receiver comprises:
a low-noise amplifier (LNA), coupled to an adjustable resonant tank, configured to suppress the main signal within the combined signal to generate a first filtered signal;
a down-converter, coupled to the LNA, configured to perform down-conversion upon the first filtered signal according to the third oscillation signal to generate a down-converted signal;
a low pass filter, coupled to the down-converter, configured to perform filtering upon the down-converted signal to generate a second filtered signal; and
an analog-to-digital converter (ADC), coupled to the low pass filter, configured to perform analog-to-digital conversion upon the second filtered signal to generate the feedback signal.

10. The transceiver of claim 3, further comprising:
a first low pass filter, coupled to the power combiner, configured to suppress the main signal within the combined signal to generate a first filtered signal;
wherein the receiver comprises:
a down-converter, coupled to the first low pass filter, configured to perform down-conversion upon the first filtered signal according to the third oscillation signal to generate a down-converted signal;
a second low pass filter, coupled to the down-converter, configured to perform filtering upon the down-converted signal to generate a second filtered signal; and
an analog-to-digital converter (ADC), coupled to the second low pass filter, configured to perform analog-to-digital conversion upon the second filtered signal to generate the feedback signal.

11. The transceiver of claim 1, wherein:
during a detection phase, the magnitude of the compensation signal is zero, and the digital baseband circuit determines a magnitude of the harmonic signal according to the feedback signal to generate a detection result; and
during a compensation phase, the digital baseband circuit controls the magnitude of the compensation signal according to the detection result, to make the compensation signal and the harmonic signal within the transmitted signal cancel each other.

12. The transceiver of claim 1, wherein:
during a detection phase, the combined signal comprises a residual signal generated by combing the harmonic signal and the compensation signal, and the digital baseband circuit determines a magnitude of the residual signal to generate a detection result; and
during a compensation phase, the digital baseband circuit controls the magnitude of the compensation signal according to the detection result, to make the magnitude of the residual signal approach zero.

13. A method for suppressing a harmonic signal in a transceiver, comprising:
utilizing a transmitter of the transceiver to output a transmitted signal, wherein the transmitted signal comprises a main signal and the harmonic signal, a frequency of the main signal is $f_{rf}$, a frequency of the harmonic signal is $(N \times f_{rf})$, and N is a non-integer less than one;
utilizing a compensation circuit of the transceiver to output a compensation signal, wherein a frequency of the compensation signal is $(N \times f_{rf})$;
utilizing a power combiner of the transceiver to combine the transmitted signal and the compensation signal to generate a combined signal;
utilizing a receiver of the transceiver to receive the combined signal and suppress the main signal within the combined signal to generate a feedback signal; and
utilizing a digital baseband circuit of the transceiver to control a magnitude of the compensation signal transmitted by the compensation circuit according to a magnitude of the feedback signal.

14. The method of claim 13, wherein utilizing the transmitter of the transceiver to output the transmitted signal comprises:
utilizing an oscillator to generate a first oscillation signal, wherein a frequency of the first oscillation signal is $(M \times f_{rf})$, and M is a non-integer greater than one;
utilizing a divided-by-M divider to perform frequency division upon the first oscillation signal to generate a second oscillation signal; and
utilizing at least one power amplifier (PA) to amplify a power of the second oscillation signal to generate the transmitted signal.

15. The method of claim 14, further comprising:
utilizing a divided-by-K divider of the transceiver to perform frequency division upon the second oscillation signal to generate a third oscillation signal, wherein K is a positive integer;
wherein the compensation signal is generated according to the third oscillation signal, and the feedback signal is generated according to the third oscillation signal.

16. The method of claim 15, wherein utilizing the compensation circuit of the transceiver to output the compensation signal comprises:
utilizing a digital-to-analog converter (DAC) to generate an analog signal according to a digital signal output from the digital baseband circuit;
utilizing an up-converter to perform up-conversion upon the analog signal according to the third oscillation signal to generate an up-converted signal; and
utilizing a gain amplifier to amplify the up-converted signal to generate the compensation signal.

17. The method of claim 15, wherein utilizing the receiver of the transceiver to receive the combined signal and suppress the main signal within the combined signal to generate the feedback signal comprises:
utilizing a low-noise amplifier (LNA) to suppress the main signal within the combined signal to generate a first filtered signal;
utilizing a down-converter to perform down-conversion upon the first filtered signal according to the third oscillation signal to generate a down-converted signal;
utilizing a low pass filter to perform filtering upon the down-converted signal to generate a second filtered signal; and utilizing an analog-to-digital converter (ADC) to perform analog-to-digital conversion upon the second filtered signal to generate the feedback signal.

18. The method of claim 15, further comprising:

utilizing a first low pass filter of the transceiver to suppress the main signal within the combined signal to generate a first filtered signal;

wherein utilizing the receiver of the transceiver to receive the combined signal and suppress the main signal within the combined signal to generate the feedback signal comprises:

utilizing a down-converter to perform down-conversion upon the first filtered signal according to the third oscillation signal to generate a down-converted signal;

utilizing a second low pass filter to perform filtering upon the down-converted signal to generate a second filtered signal; and utilizing an analog-to-digital converter (ADC) to perform analog-to-digital conversion upon the second filtered signal to generate the feedback signal.

19. The method of claim 13, wherein utilizing the digital baseband circuit of the transceiver to control the magnitude of the compensation signal transmitted by the compensation circuit according to the magnitude of the feedback signal comprises:

during a detection phase, setting the magnitude of the compensation signal to be zero, and determining a magnitude of the harmonic signal according to the feedback signal to generate a detection result; and during a compensation phase, controlling the magnitude of the compensation signal according to the detection result, to make the compensation signal and the harmonic signal within the transmitted signal cancel each other.

20. The method of claim 13, wherein the combined signal comprises a residual signal generated by combing the harmonic signal and the compensation signal, and utilizing the digital baseband circuit of the transceiver to control the magnitude of the compensation signal transmitted by the compensation circuit according to the magnitude of the feedback signal comprises:

during a detection phase, determining a magnitude of the residual signal to generate a detection result; and during a compensation phase, controlling the magnitude of the compensation signal according to the detection result, to make the magnitude of the residual signal approach zero.

* * * * *